US006399545B1

(12) United States Patent
Rose

(10) Patent No.: US 6,399,545 B1
(45) Date of Patent: Jun. 4, 2002

(54) METHOD AND COMPOSITION OF DRILLING WITH FLUID INCLUDING ADDITIVE

(75) Inventor: Ron A. Rose, Alto, TX (US)

(73) Assignee: Grinding & Sizing Co., Inc., Lufkin, TX (US)

( * ) Notice: Subject to any disclaimer, the term of this patent is extended or adjusted under 35 U.S.C. 154(b) by 0 days.

(21) Appl. No.: 09/359,489

(22) Filed: Jul. 23, 1999

(51) Int. Cl.⁷ .................................. C09K 7/00
(52) U.S. Cl. ..................... 507/104; 507/204; 175/72
(58) Field of Search ................. 507/104, 204; 175/72

(56) References Cited

U.S. PATENT DOCUMENTS

| | | | | |
|---|---|---|---|---|
| 2,601,050 A | * | 6/1952 | Nestle | 507/104 |
| 2,607,730 A | * | 8/1952 | Ragland | 507/104 |
| 2,749,308 A | * | 6/1956 | Van Beckum | 507/104 |
| 2,749,309 A | * | 6/1956 | Heritage | 507/104 |
| 2,789,948 A | * | 4/1957 | Tronolone | 507/104 |
| 2,811,488 A | * | 10/1957 | Nestle et al. | 507/104 |
| 2,846,390 A | * | 8/1958 | Lummus et al. | 507/104 |
| 3,042,607 A | * | 7/1962 | Morris | 507/104 |
| 3,245,469 A | * | 4/1966 | Bertness | 175/72 |
| 3,371,054 A | * | 2/1968 | Blickensderfer | 507/104 |
| 3,377,276 A | * | 4/1968 | Parker | 507/104 |
| 5,004,553 A | | 4/1991 | House et al. | 252/8.51 |
| 5,071,575 A | | 12/1991 | House et al. | 507/104 |
| 5,147,852 A | | 9/1992 | Cowan et al. | 507/104 |
| 5,229,018 A | | 7/1993 | Forrest | 252/8.551 |
| 5,484,028 A | * | 1/1996 | Rose | 175/72 |
| 5,599,776 A | * | 2/1997 | Burts, Jr. | 507/104 |
| 5,763,367 A | * | 6/1998 | Burt, Jr. | 507/104 |

OTHER PUBLICATIONS

Kirk–Othmer, Encyclopedia of Chemical Technology, vol. 7, 2$^{nd}$ Edition, (1965), pp. 297–298.*

* cited by examiner

Primary Examiner—Philip Tucker
(74) Attorney, Agent, or Firm—Bracewell & Patterson, LLP

(57) ABSTRACT

The present invention discloses a method of performing drilling operations wherein a drilling fluid is circulated in a well being drilled in the ground comprising the steps of grinding a tannin-containing organic waste to form granules, adding the ground tannin-containing organic waste product to the drilling fluid, and circulating the drilling fluid with the ground tannin-containing organic waste product in the well while drilling operations are being carried out. In a preferred embodiment, tannin-containing organic waste products include grape pomace, tomato pomace, yellow pine bark, yellow pine, wood bark and the like.

7 Claims, No Drawings

METHOD AND COMPOSITION OF DRILLING WITH FLUID INCLUDING ADDITIVE

BACKGROUND OF THE INVENTION

1. Field of the Invention

The invention relates to an improved method for decreasing the lost circulation and fluid loss or seepage loss of drilling fluid and to the composition of the drilling fluid with particular additives.

2. Description of the Prior Art

For drilling operations, a drilling mud system is designed as a circulating system with all the fluid retained in the system itself. However, various types of losses do occur during the drilling operation. Some losses occur on the surface due to storage, evaporation and other environmental factors. However, the greatest loss of fluid generally occurs down hole during a drilling operation. These losses can take several different forms. For example, large, gross loss of whole fluid (solids and liquid) is commonly referred to as lost circulation. This occurs when the whole mud seeps into large sand formations and cavities. Lost circulation can be anywhere from 100% to only a partial loss of returns down to 20% or 30%. These losses must be compensated by further addition of expensive drilling mud. It is desirable to avoid further loss of whole mud by use of additives that plug the sands and cavities.

At the other extreme is a loss of only the liquid phase which is generally referred to as fluid loss. This loss occurs as the result of the actual filtration of the solids by the formation due to a differential pressure from the fluid column to the formation. The result is that the non-fluid portion remains in the bore hole. As this occurs, a filter cake forms which, if allowed to build, results in the drill pipe becoming stuck. A generalized category that is referred to as seepage loss occurs when there is a combination of whole loss of fluid coupled with filtration losses. These losses are small but continuous.

Numerous patents address the problem of lost circulation or seepage. Patent literature is replete with examples of various agricultural and cellulosic waste products being used as lost circulation materials and seepage control agents designed to function in specific ways. Yet lost circulation remains a critical issue in the drilling industry often directly affecting the profitability of a well.

Examples of patents addressing this recognized problem include U.S. Pat. No. 5,071,575 and 5,004,553 issued to House for well working compositions using ground oat hulls in a certain particle size range with the possibility of adding one or more agricultural byproducts including ground citrus pulp. Likewise, U.S. Pat. No. 5,147,852 issued to Cowan, discusses the use of cellulose materials generally described as those from wood sources of fibrous materials, indicating generally the benefit of cellulose.

Various agricultural and cellulosic waste products are generally taught for being used as lost circulation materials and seepage control agents. Also, a variety of patents teach different particle size and distribution based on their physical properties. For example U.S. Pat. No. 5,229,018 issued to Forest teaches the use of peanut hulls as an additive along with a suitable suspending agent. Forest identifies the critical elements as being the size of the particles and the percentage of compositions of various naturally occurring compounds. As such, Forest teaches that the peanut hull is particularly useful as a drilling additive.

In spite of the wide body of research and material devoted to solving the problem of fluid loss and seepage control, drilling conditions continue to evolve and improved additives are proactively sought by drilling companies. Some of the currently used additives alter the properties of the drilling fluids, such as viscosity, creating additional problems in operation. Other additives may be useful as lost circulation additives while proving ineffective for controlling fluid loss.

Common additives tend to drastically alter the properties of the drilling fluid. For example, use of certain cellulose materials is known to "break" emulsions. When this occurs, fluid loss becomes extremely high and other adverse effects occur. This can occur with plasticizers as well. Also, known products generally tend to increase the viscosity of the fluid and add to the colloidal concentration of particles, resulting in decreased penetration rates. This also leads to problems associated with the lubricating characteristics of the drilling fluid. An improved additive is needed to meet the needs of the drilling industry.

It is an object and a goal of this invention to provide an additive that effectively prevents fluid loss, seepage and lost circulation.

It is an object and a goal of this invention to provide an organic additive which, when mixed with drilling fluid, creates a fluid that reduces fluid loss, seepage and lost circulation.

It is an object and a goal of this invention to provide an organic by-product with naturally occurring desirable compounds for improved control of lost circulation, fluid loss and seepage.

It is an object and a goal to use discarded organic material which would otherwise be a waste product.

It is an object and a goal of this invention to provide an organic additive that reduces the need to add further refined chemical components to the system, such as lignosulfonates and tannins.

It is an object of the present invention to provide an additive which is highly effective as a lost circulation and seepage control agent in both water base and oil base well working fluids.

It is an object of the invention to provide an additive which controls seepage loss and lost circulation without adversely affecting the rheology of the system.

It is another object of this invention to provide well working compositions having a low lost circulation or seepage loss.

It is an object of this invention to use the waste product of other industries as a feedsource for the additive.

These and other objects of the invention will appear to one skilled in the art as the description thereof proceeds.

BRIEF SUMMARY OF THE INVENTION

The present invention includes a method of performing drilling operations wherein a drilling fluid is circulated in a well being drilled in the ground comprising the steps of grinding a tannin-containing organic waste to form granules, adding the ground tannin-containing organic waste product to the drilling fluid, and circulating the drilling fluid with the ground tannin-containing organic waste product in the well while drilling operations are being carried out. In a preferred embodiment, tannin-containing organic waste products include grape pomace, tomato pomace, beet pomace, yellow pine bark, yellow pine, wood bark and the like. A pomace, such as tomato, grape or beet, is generally described as the crushed matter remaining of the pressed items. This can contain any combination of pulp, skin, seed or other naturally occurring substance in the pressed item. These organic products can be used individually or in combination.

This invention also encompasses a lost circulation/fluid loss additive for drilling fluid. The lost circulation/fluid loss additive comprises one or more of the following: ground grape pomace, ground tomato pomace, ground yellow pine bark, ground wood bark, ground yellow pine or the like. This additive is useful to control lost circulation, seepage and/or fluid loss.

The structure and method of the present invention as well as other features, advantages, benefits and objects thereof over other structures and methods known in the art can be better understood with reference to the detailed description which follows.

DETAILED DESCRIPTION OF THE INVENTION

While it is known in the industry to use ground wood for its fibrous content to reduce lost circulation, it has been unrecognized by the industry that pine and pine products provide surprisingly efficient results over other woods. It is postulated that the unexpected efficacity results from naturally occurring compounds in pine performing a function that is separate from or enhancing of the cellulose fiber function. This results in increased efficacity. Furthermore, while many organic products have been tested for fluid loss and seepage control in the industry, the advantages of use of the bark of wood or of tomato and grape pomace has been unrecognized.

The organic materials of the present invention are herein described as tannin-containing organic waste products, as it is hypothesized that tannin or tannin precursors play a role in the unexpected results. The term "tannin" is loosely defined. It is generally considered a polyphenolic compounds and/or a sugar-containing compound, such as a glucoside. Most plants produce tannins in some varying amount with concentrations tending to be higher in the skin of the fruits or other surface pores. Tannins are complex organic materials frequently with high molecular weight and and large molecules.

Cellulose has a direct surface interaction with tannin. It is believed that tannin effects enzyme and microbial action. The ascorbic acid, citric acid, sugar or flavanoids in the tomato, grape and beet pomace can also play a role in the characteristics of these additives. Thus, tannin-containing organic waste products includes those organic items which produce a significant amount of tannins, tannic acid, polyphenolic compounds, glucosides, flavanoids and the like. This includes tomato pomace or pulp, grape pomace, yellow pine, yellow pine bark and wood bark.

When the pine or pine bark is introduced as a seepage loss reducing additive, the viscosity of the mud is also decreased. This effect of thinning the mud while simultaneously reducing seepage loss is a substantial advantage over the methods previously utilized. The organic additive acts to intrude into the pores of the strata to prevent seepage. The acidity of the pine and other tannin-containing organic products produces an additional desirable effect by acting as a biocide.

The organic products to be ground are all typical byproducts from other industries and thus can be economically obtained. In fact, they are frequently considered waste materials and therefore pose a waste disposal problem. For example, pine bark is a waste product from the timber processing industry.

The additives are made by grinding the waste material. In some cases, further drying and/or pressing is performed prior to such grinding, depending on the moisture content of the tannin-containing organic products. Another preferred embodiment includes heating the products for a length of time in order to sanitize the organic products, thus further reducing the possibility of undesirable biological activity when the additive is mixed with the drilling fluid.

After the organic products of the invention have been ground, they are added to the drilling fluid. There are various apparatuses and methods known in the art for adding materials to drilling fluid such that the material is incorporated into the fluid, all of which are useful in this invention. A preferred embodiment includes mixing the ground tannin-containing organic product into the drilling fluid using a conventional jet-type hopper.

The additive is typically ground coarse, medium, fine or ultra fine, depending upon the particular usage. Coarse is generally that which will pass through a 4 mesh and retained on a 60 mesh. Medium is consider that which will pass through a 20 mesh and be retained on a 100 mesh. Fine is typically that which will pass through a 60 mesh and be retained on a 600 mesh. Ultra fine passes through meshes smaller than 600 mesh. There are general categories of definitions and include some overlapping sizes of mesh. A preferred embodiment of the current invention includes providing two to fifty lbs of additive per barrel of mud circulated.

The method and additives of the present invention can be used with both water-base or oil base muds and fluids. Thus, the present invention provides a compound, method, and system for improving drilling fluid.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

For example, the tannin-containing organic products discussed are readily available as by-products of the processing industry. Other organic products that contain effective amounts of tannins or like compounds can also be used in this invention. While the range of tannin concentrations can vary within any given organic compound, pine bark typically contain around fifteen percent (15%) tannin. Other plants containing high levels of tannin compounds include redwood, cedar, wattle, oak, eucalyptus, birch, willow and quebracho. Other fruits and vegetables that produce significant amounts of tannin or the like are encompassed within this invention.

The additives of this invention for use with drilling fluids not only perform as control agents for seepage and lost fluid, but also act as a thinner. The use of these compounds for purposes of thinning is encompassed within this invention.

What is claimed is:

1. A method of performing drilling operations wherein a drilling fluid is circulated in a well being drilled in the ground comprising the steps of:

grinding yellow pine to form granules, adding the ground yellow pine to the drilling fluid, and circulating said drilling fluid, with said ground yellow pine in said well while drilling operations are being carried out; and wherein said yellow pine is not altered or processed other than by drying, pressing or heating.

2. The method of claim 1 wherein the yellow pine comprises yellow pine bark.

3. The method of claim 1 wherein the yellow pine consists essentially of yellow pine bark.

4. A lost circulation/fluid loss additive for drilling fluid comprising ground grape pomace.

5. A lost circulation/fluid loss additive for drilling fluid comprising ground tomato pomace.

6. A method of performing drilling operations wherein a drilling fluid is circulated in a well being drilled in the ground comprising the steps of:

grinding a tannin-containing organic waste product to form granules, wherein the tannin-containing organic waste comprises grape pomace;

adding the ground tannin-containing organic waste product to the drilling fluid; and circulating said drilling fluid, with said ground tannin-containing organic waste product, in said well while drilling operations are being carried out.

7. A method of performing drilling operations wherein a drilling fluid is circulated in a well being drilled in the ground comprising the steps of:

grinding a tannin-containing organic waste product to form granules, wherein the tannin-containing organic waste comprises tomato pomace;

adding the ground tannin-containing organic waste product to the drilling fluid; and circulating said drilling fluid, with said ground tannin-containing organic waste product, in said well while drilling operations are being carried out.

* * * * *